United States Patent [19]
Glance

[11] 3,831,705
[45] Aug. 27, 1974

[54] ENERGY ABSORBING DASH STRUCTURE
[75] Inventor: Patrick M. Glance, Plymouth, Mich.
[73] Assignee: Ford Motor Company, Dearborn, Mich.
[22] Filed: June 28, 1972
[21] Appl. No.: 266,916

[52] U.S. Cl. .................................. 180/90, 280/150
[51] Int. Cl. ............................................. B60k 37/00
[58] Field of Search ....................... 180/90; 280/150

[56] References Cited
UNITED STATES PATENTS
| | | | |
|---|---|---|---|
| 2,070,760 | 2/1937 | Straith | 180/90 UX |
| 2,375,567 | 5/1945 | Luton | 180/90 |
| 3,439,769 | 4/1969 | Brilmyer | 280/150 B |

FOREIGN PATENTS OR APPLICATIONS
882,167 11/1961 Great Britain ................. 180/90

Primary Examiner—Evon C. Blunk
Assistant Examiner—James M. Slattery
Attorney, Agent, or Firm—Keith L. Zerschling; John J. Roethel

[57] ABSTRACT

A two stage energy absorbing dash structure is adapted to be positioned in a motor vehicle compartment forwardly of the vehicle seating area. The dash structure has a chest impact zone and a head impact zone. The chest impact zone provides first stage dissipation of energy in decelerating a vehicle occupant during collision conditions and the head impact zone provides for a second stage of energy dissipation. The second stage of energy dissipation may be enhanced by a knee impact zone of the dash structure. The dash structure includes at least one energy absorbing tension member extending between panels forming the dash structure to control the load deflection during energy absorption.

4 Claims, 5 Drawing Figures

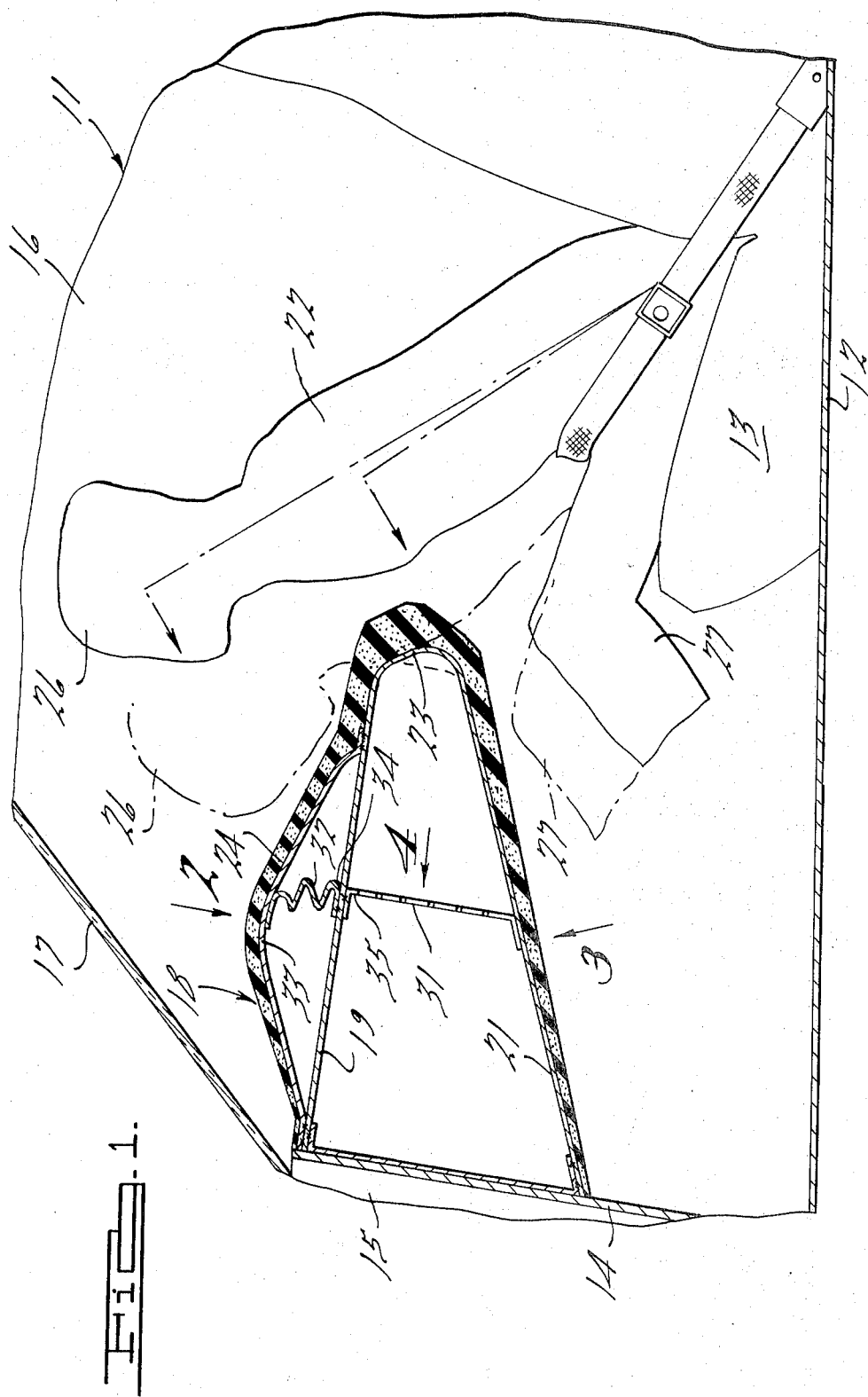

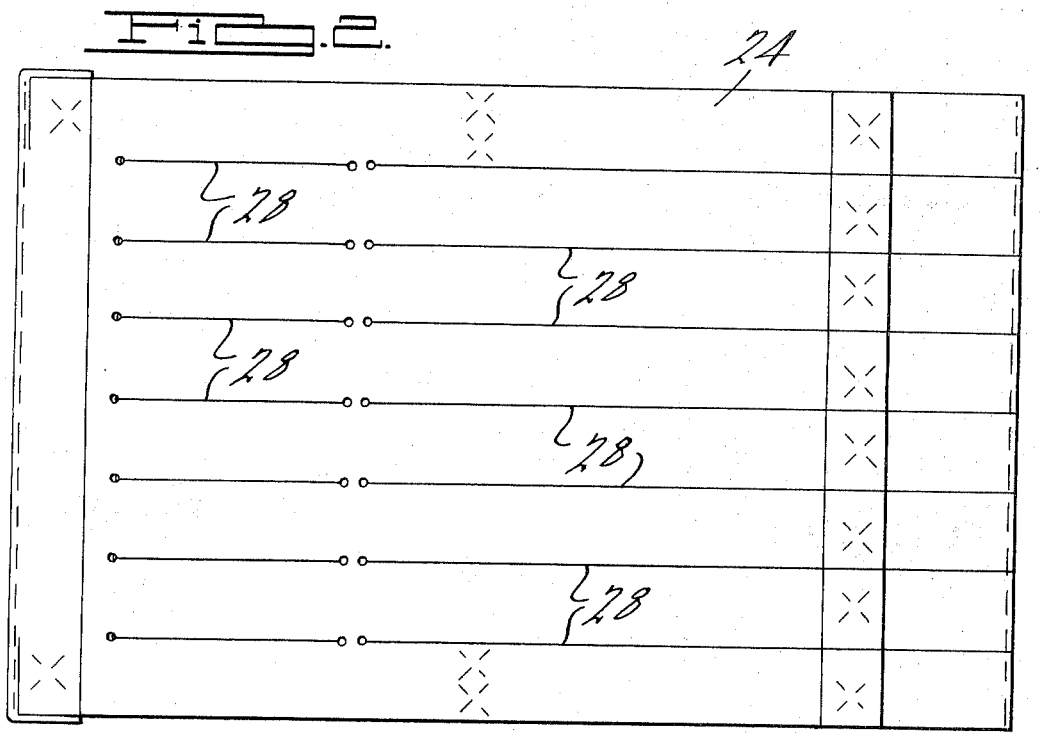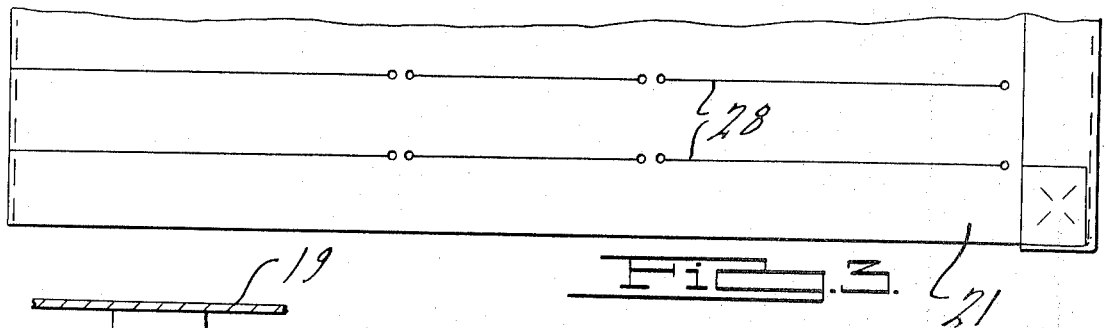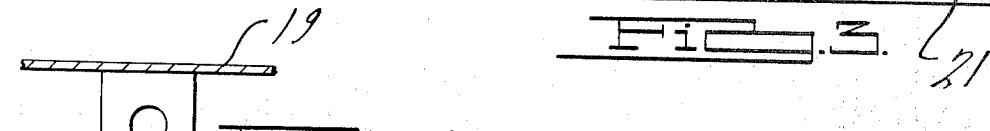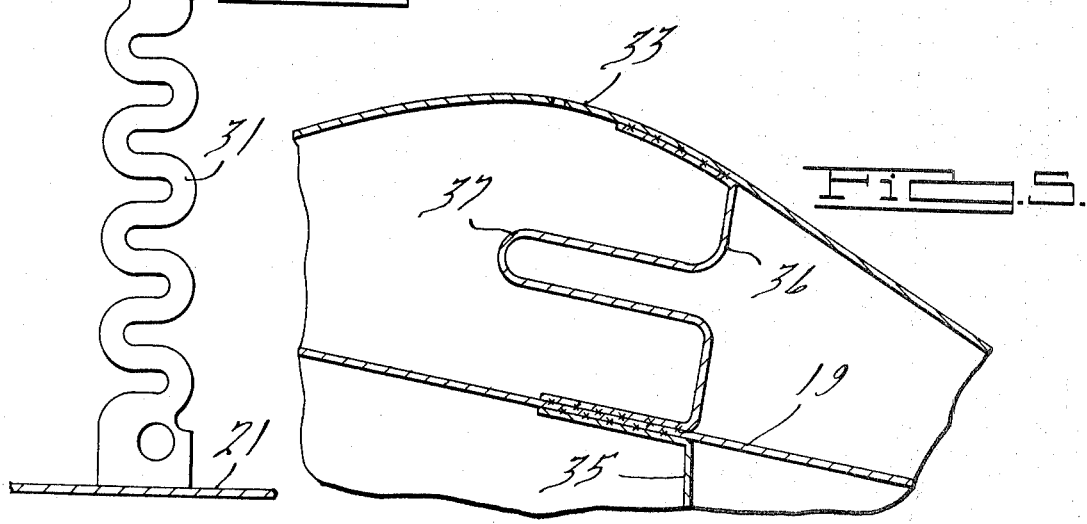

ENERGY ABSORBING DASH STRUCTURE

BACKGROUND OF THE INVENTION

U.S. Pat. No. 3,439,769, issued Apr. 22, 1969 to H. G. Brilmyer for "Safety Instrument Panel" discloses an instrument panel or vehicle dash structure formed of sheet steel and having sufficient strength characteristics to serve as a structural member in the vehicle body. Slot means extend through the panel at areas subject to impact from body portions of a vehicle passenger during a vehicle collision. The slot means weaken the structural resistance of the sheet to deformation at the selected areas and thereby promotes the dissipation of impact energy.

It is an object of the present invention to further improve on the structure shown in the Brilmyer patent by providing a cowl structure having two definite stages of energy absorption and also to incorporate tension means to control the load deflection of the structure.

SUMMARY OF THE INVENTION

The present invention comprises a two stage energy absorbing dash structure adapted to be positioned in a motor vehicle compartment forwardly of the vehicle seating area. The dash structure comprises an elongated sheet material structure having upper and lower spaced panels connected at the end adjacent the vehicle seating area by a contoured end section. The contoured end section is substantially in alignment with the chest area of a 50 percentile seat occupant to provide a chest impact zone for first stage dissipation of energy in decelerating the occupant during collision conditions. The upper panel provides a head impact zone for second stage dissipation of energy which may be enhanced by an area of the lower panel providing a knee impact zone for second stage dissipation of energy.

As taught by U.S. Pat. No. 3,439,769, plural adjacent slot means formed through the panels at the impact zones promote the dissipation of impact energy by weakening the resistance of the panels to deformation. Padding means are provided secured to the panels covering at least the slotted areas. An important feature of the present invention is the provision of at least one energy absorbing tension member extending between upper and lower spaced panels to control the load deflection of the panels.

DESCRIPTION OF THE DRAWINGS

Further features and advantages of the present invention will be made more apparent as this description proceeds, reference being had to the accompanying drawings, wherein:

FIG. 1 is a view of a fragmentary portion of a vehicle passenger compartment, in part sectional, disclosing a vehicle dash structure constructed and arranged according to the present invention;

FIG. 2 is a view in the direction of the arrow 2 in FIG. 1 illustrating the plurality of slots in a portion of the panel structure to promote the dissipation of impact energy by weakening the resistance of the panels to deformation;

FIG. 3 is a fragmentary view in part similar to FIG. 2 illustrating the slot arrangement in a second portion of the panel structure;

FIG. 4 is a view in the direction of the arrow 4 illustrating an energy absorption tension device extending between panel portions of the cowl structure; and FIG. 5 is a view illustrating a modification of the energy absorbing tension member extending between the head impact panel and the upper main panel of the cowl structure.

DETAILED DESCRIPTION OF THE INVENTION

Referring now to FIG. 1, the numeral 11 denotes a fragmentary portion of a vehicle body having a floor structure 12, a seat 13 supported on the floor structure, a wall 14 separating the engine compartment 15 from a vehicle occupant 16 and a windshield 17. Supported on the wall 14 and projecting rearwardly toward the seating area defined by the seat 13 is a dash structure generally designated 18.

The dash structure 18 is formed of sheet material and extends laterally of the passenger compartment 16. It comprises an upper panel 19 and a lower panel 21. The upper panel 19 may be substantially horizontal or, as shown provided with a slight downward slope. The lower panel 21 has an upward slope to provide leg clearance with the seat occupant 22. The ends of the panel 19 and 21 adjacent the seat 13 are connected by a contoured or rounded end portion 23.

The contoured or rounded end portion 23 is substantially in alignment with the chest area of a 50 percentile seat occupant, for a purpose to be explained.

The upper panel 19 preferably has welded thereto an auxiliary panel 24 which, as seen in FIG. 1, has a substantially triangular cross sectional appearance.

The dash structure 18 is constructed and arranged to provide two stages of energy absorption during deceleration of the vehicle occupant 22 as occurs under vehicle collision conditions. Whether the occupant is or is not restrained by a seat belt 25, there is forward movement of his torso under sudden stop conditions. The chest area of the occupant will impact the end portion 23 of the dash structure 18. The deformation of this end portion 23 provides a first stage of energy absorption at a rate to minimize internal injury to the occupant.

As the chest area is restrained, the occupant's head 26 may continue a forward downward movement and his knees 27 may move forwardly and upwardly. The impact of the head and knees in a time sequence will come later than the chest impact. The upper panel 19, with its auxiliary panel 24, and the lower panel 21 thus function as second stage energy absorbers. These panels yieldably deform as they absorb the energy of the impacting head and knees of the seat occupant.

Plural adjacent slots 28 extend through the panels at the impact zones to promote the dissipation of impact energy by weakening the panels resistance to deformation. Reference is made to the aforementioned Brilmyer U.S. Pat. No. 3,439,769 for a detailed explanation of the slots 28.

The dash structure 18 preferably is covered with an energy absorbing padding 29 to provide protection against minor impacts and also to protect against laceration of skin areas impacting the surfaces of the panels.

An important feature of the present invention is the utilization of energy absorbing tension members between spaced panels to control the load deflection of the panels. As best seen in FIG. 1, a strip member 31 extends between the upper and lower panels 19 and 21. As shown in FIG. 4, the strip member 31 has a serpentine configuration and is stretchable under tension at a controlled rate. It is positioned substantially intermediate the end portion 23 and the wall 14 mounted ends of the dash structure. A plurality of the strip members 31 may be spaced along the length of the dash structure.

A second tension member 32 may be positioned to extend from substantially the apex 33 of the auxiliary panel 24 through the upper panel 19. The lower end 34 of the member 32 is shown in substantial vertical alignment with the upper end 35 of the strip member 31. The member 34 is shown in FIG. 1 as having a serpentine configuration in cross section. As shown in FIG. 5, it may be a strip member 36 having a U-shaped section 37 intermediate its ends.

Upon impact of the dash structure 18, the members 31 and 32 tend to react in tension since the various panel sections of the dash structure tend to move away from each other as the dash structure is compressed toward the front wall 14 of the vehicle passenger compartment. As the members 31 and 32 are stretched, they function to control load deflection of the panels. The energy absorption of the dash panel occurs at a much more uniform rate than if the tension members 31 and 32 are not utilized.

Although no mention has been made of the specific material used in the dash structure and its various components, the usual material would be sheet metal.

It will be understood that the invention is not to be limited to the exact construction shown and described, but that various changes and modifications may be made without departing from the spirit and scope of the invention as defined in the appended claims.

I claim:

1. A two stage energy absorbing dash structure adapted to be positioned in a motor vehicle compartment forwardly of a vehicle seating area,
    the dash structure comprising an elongate sheet material structure having upper and lower spaced panels connected at the end adjacent the vehicle seating area by a contoured end section,
    the contoured end section being substantially in alignment with the chest area of a 50 percentile seat occupant to provide a chest impact zone for first stage dissipation of energy in decelerating the occupant during collision conditions,
    and the upper panel providing a head impact zone for second stage dissipation of energy,
    plural adjacent slot means extend through the panels at the impact zones to promote the dissipation of impact energy by weakening the resistance of the panels to deformation,
    padding secured to the panels covering at least the slotted areas,
    and at least one energy absorbing tension member extending between the upper and lower spaced panels to control the load deflection of the panels,
    an auxiliary impact panel supported on the upper panel,
    and the auxiliary panel being substantially triangular in shape with the apex spaced from the upper surface of the upper panel.

2. A two stage energy absorbing dash structure according to claim 1, in which:
    at least one energy absorbing tension member extends from substantially the apex of the auxiliary panel to the upper surface of the upper panel.

3. A two stage energy absorbing dash structure according to claim 2, in which:
    the lower panel provides a knee impact zone also for second stage dissipation of energy.

4. An energy absorbing dash structure positioned in a motor vehicle compartment forwardly of a vehicle seating area;
    the dash structure comprising an elongate length of sheet material having an upper panel means forming a head impact zone,
    a lower panel means spaced from the upper panel means and forming a knee impact zone,
    and an end portion joining the two panel means and facing the seating area to form a chest impact zone;

plural adjacent slot means formed through the panel means at the impact zones to promote the dissipation of impact energy by weakening the resistance of the panels to deformation;
    padding secured to the panel means covering at least the slotted areas,
    and at least one energy absorbing tension member extending between the upper and lower panel means to control the load deflection of the panels, the upper panel means comprises a base panel and a substantially triangular auxiliary panel mounted thereon with its apex spaced from the base panel, and at least one energy absorbing tension member extends from substantially the apex of the auxiliary panel to the base panel of the upper panel means.

* * * * *